(12) United States Patent
Kang

(10) Patent No.: US 11,196,945 B2
(45) Date of Patent: Dec. 7, 2021

(54) ELECTRONIC DEVICE INCLUDING CAMERA MODULE AND METHOD FOR CONTROLLING ELECTRONIC DEVICE

(71) Applicant: Samsung Electronics Co., Ltd., Gyeonggi-do (KR)

(72) Inventor: Hwayong Kang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 34 days.

(21) Appl. No.: 16/491,725

(22) PCT Filed: Feb. 28, 2018

(86) PCT No.: PCT/KR2018/002450
§ 371 (c)(1),
(2) Date: Sep. 6, 2019

(87) PCT Pub. No.: WO2018/164411
PCT Pub. Date: Sep. 13, 2018

(65) Prior Publication Data
US 2020/0014864 A1    Jan. 9, 2020

(30) Foreign Application Priority Data
Mar. 7, 2017  (KR) .......................... 10-2017-0028806

(51) Int. Cl.
*H04N 5/347* (2011.01)
*G06F 3/01* (2006.01)
(Continued)

(52) U.S. Cl.
CPC ............. *H04N 5/347* (2013.01); *G06F 3/017* (2013.01); *H04N 5/353* (2013.01); *H04N 5/36961* (2018.08)

(58) Field of Classification Search
CPC .... H04N 5/347; H04N 5/36961; H04N 5/353; H04N 5/225; H04N 5/2258; H04N 5/2257; G06F 3/017; G06F 3/005
See application file for complete search history.

(56) References Cited

U.S. PATENT DOCUMENTS 8,854,433 B1 * 10/2014 Rafii ...................... G06F 3/017
348/47
2009/0090841 A1    4/2009 Kusaka
(Continued)

FOREIGN PATENT DOCUMENTS

JP           5538553        7/2014
JP        2015216186       12/2015
(Continued)

OTHER PUBLICATIONS

PCT/ISA/210 Search Report issued on PCT/KR2018/002450, pp. 5.
PCT/ISA/237 Written Opinion issued on PCT/KR2017/002450, pp. 6.

*Primary Examiner* — Shahbaz Nazrul
(74) *Attorney, Agent, or Firm* — The Farrell Law Firm, P.C.

(57) ABSTRACT

The present invention relates to an electronic device including a camera module and a method for controlling the electronic device. According to various embodiments of the present invention, a camera module may comprise: an image sensor comprising a first pixel comprising multiple first light reception units and a second pixel comprising multiple second light reception units; and a calculation unit functionally connected to the image sensor and capable of measuring depth information, wherein the calculation unit is configured to: acquire a first signal corresponding to a first part of an external object, using the multiple first light reception units, and a second signal corresponding to a second part of the external object, using the multiple second light reception (Continued)

units; identify first phase difference information corresponding to the first signal and second phase difference information corresponding to the second signal; determine location information of the first part and the second part, at least on the basis of the first phase difference information and the second phase difference information; and provide the location information to an external processor of the camera module connected to the calculation unit.

14 Claims, 11 Drawing Sheets

(51) Int. Cl.
  *H04N 5/369* (2011.01)
  *H04N 5/353* (2011.01)

(56) References Cited

U.S. PATENT DOCUMENTS

| | | | |
|---|---|---|---|
| 2012/0105690 | A1 | 5/2012 | Waqas et al. |
| 2013/0222546 | A1 | 8/2013 | Takahashi |
| 2013/0242173 | A1* | 9/2013 | Kadohara ........ H04N 5/232122 348/349 |
| 2013/0321826 | A1* | 12/2013 | Chen ................. G01S 13/56 356/623 |
| 2014/0226039 | A1* | 8/2014 | Yamamoto ........ H04N 5/22541 348/239 |
| 2014/0267865 | A1* | 9/2014 | Kishi ................. H04N 5/369 348/310 |
| 2014/0313373 | A1* | 10/2014 | Sugawara ............ G06T 5/003 348/239 |
| 2014/0359410 | A1* | 12/2014 | Lee ................... G06F 40/134 715/205 |
| 2015/0319420 | A1* | 11/2015 | Fettig ............... H01L 27/14627 348/49 |
| 2015/0357360 | A1* | 12/2015 | Tian ................ H01L 27/14605 250/208.2 |
| 2016/0239974 | A1* | 8/2016 | Wang ................... G06T 7/55 |
| 2016/0360081 | A1* | 12/2016 | Tsubaki ............ H04N 5/23267 |
| 2016/0373641 | A1 | 12/2016 | Seo |
| 2017/0003379 | A1* | 1/2017 | Downing ............. G01S 17/36 |
| 2017/0053956 | A1 | 2/2017 | Nakamura |
| 2017/0070664 | A1 | 3/2017 | Yoon et al. |
| 2017/0310879 | A1* | 10/2017 | Takayama ............ G06T 7/70 |
| 2017/0347042 | A1* | 11/2017 | Borthakur .......... H04N 5/36961 |
| 2017/0366769 | A1* | 12/2017 | Mlinar ............... H04N 5/23212 |
| 2018/0063413 | A1* | 3/2018 | Yoshino ............... G03B 39/00 |
| 2018/0063416 | A1* | 3/2018 | Kimoto ................ H04N 5/235 |

FOREIGN PATENT DOCUMENTS

| | | |
|---|---|---|
| JP | 5979849 | 8/2016 |
| JP | 2016149765 | 8/2016 |
| KR | 1020150097987 | 8/2015 |
| KR | 1020150121564 | 10/2015 |

* cited by examiner

FIG. 8
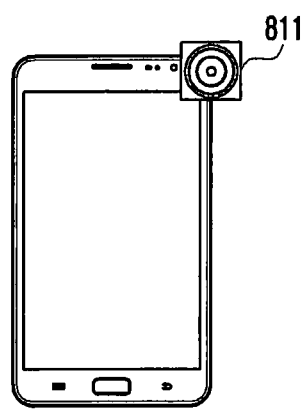
⟨810⟩
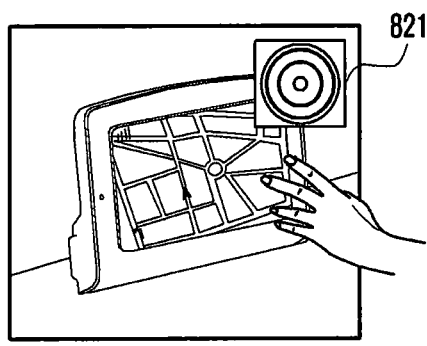
⟨820⟩
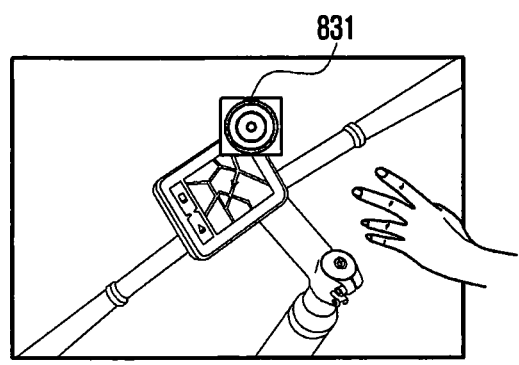
⟨830⟩

ELECTRONIC DEVICE INCLUDING CAMERA MODULE AND METHOD FOR CONTROLLING ELECTRONIC DEVICE

PRIORITY

This application is a National Phase Entry of PCT International Application No. PCT/KR2018/002450 which was filed on Feb. 28, 2018, and claims priority to Korean Patent Application No. 10-2017-0028806, which was filed on Mar. 7, 2017, the content of each of which is incorporated herein by reference.

TECHNICAL FIELD

The disclosure relates to an electronic device including a camera module and a method of controlling the same.

BACKGROUND ART

An electronic device may extract depth information for a detected user gesture, for example, when the user gesture is detected, and may perform a function for controlling the electronic device based on the extracted depth information. For example, the electronic device may extract depth information for a user gesture using a separately provided dual camera or an infrared (IR) sensor. If the dual camera is used, the electronic device may extract depth information for a user gesture from information on two images obtained from the dual camera. Furthermore, if the IR sensor is used, the electronic device may extract depth information for a user gesture based on the analysis of an image of an IR pattern or phase difference information between the reception and transmission of IR signals.

DISCLOSURE OF INVENTION

Technical Problem

However, if depth information for a user gesture is extracted through the above-described dual camera, an electronic device may require high consumption power because it must drive the dual camera. Furthermore, if the IR sensor is used, precision may be reduced in extracting depth information for a user gesture due to the influence of an external environment.

According to various embodiments of the disclosure, an electronic device may provide an image sensor optimized to recognize an external object with low power. For example, the electronic device may provide an image sensor configured with a pixel including a plurality of light receiving units so that the image sensor operates as a sensor for recognizing an external object.

Solution to Problem

According to an embodiment of the disclosure, a camera module includes an image sensor configured to include a first pixel comprising a plurality of first light receiving units and a second pixel comprising a plurality of second light receiving units and a computation unit functionally connected to the image sensor and configured to measure depth information. The computation unit may be configured to obtain a first signal corresponding to a first part of an external object using the plurality of first light receiving units and a second signal corresponding to a second part of the external object using the plurality of second light receiving units, identify first phase difference information corresponding to the first signal and second phase difference information corresponding to the second signal, identify location information for the first part and the second part based on at least the first phase difference information and the second phase difference information, and provide the location information to an external processor of the camera module connected to the computation unit.

According to various embodiments of the disclosure, an electronic device includes a camera module configured to recognize an external object, a memory and a processor electrically connected to the camera module and the memory. The processor may be configured to obtain location information for at least part of the recognized external object from the camera module, identify a motion of the external object based on the location information, and perform a control function of the electronic device corresponding to the motion.

According to various embodiments of the disclosure, a method of controlling an electronic device including a camera module may include recognizing an external object using a first pixel including a plurality of first light receiving units and a second pixel including a plurality of second light receiving units configuring an image sensor, obtaining a first signal corresponding to a first part of the recognized external object using the plurality of first light receiving units and a second signal corresponding to a second part of the recognized external object using the plurality of second light receiving units, identifying first phase difference information corresponding to the first signal and second phase difference information corresponding to the second signal, identifying location information for the first part and the second part based on at least the first phase difference information and the second phase difference information, and providing the location information to an external processor of the camera module.

Advantageous Effects of Invention

According to various embodiments of the disclosure, the electronic device may recognize an external object with low power through the image sensor configured with a pixel including a plurality of light receiving units.

According to various embodiments of the disclosure, the electronic device may accurately extract phase difference information for an external object at a short distance through the image sensor configured with a pixel including a plurality of light receiving units.

According to various embodiments of the disclosure, the electronic device may easily recognize an external object through the image sensor including the module for adjusting exposure based on context.

BRIEF DESCRIPTION OF DRAWINGS

FIG. 8 is a diagram for illustrating an example in which the image sensor is used according to various embodiments of the disclosure.

MODE FOR THE INVENTION

Figure 1:
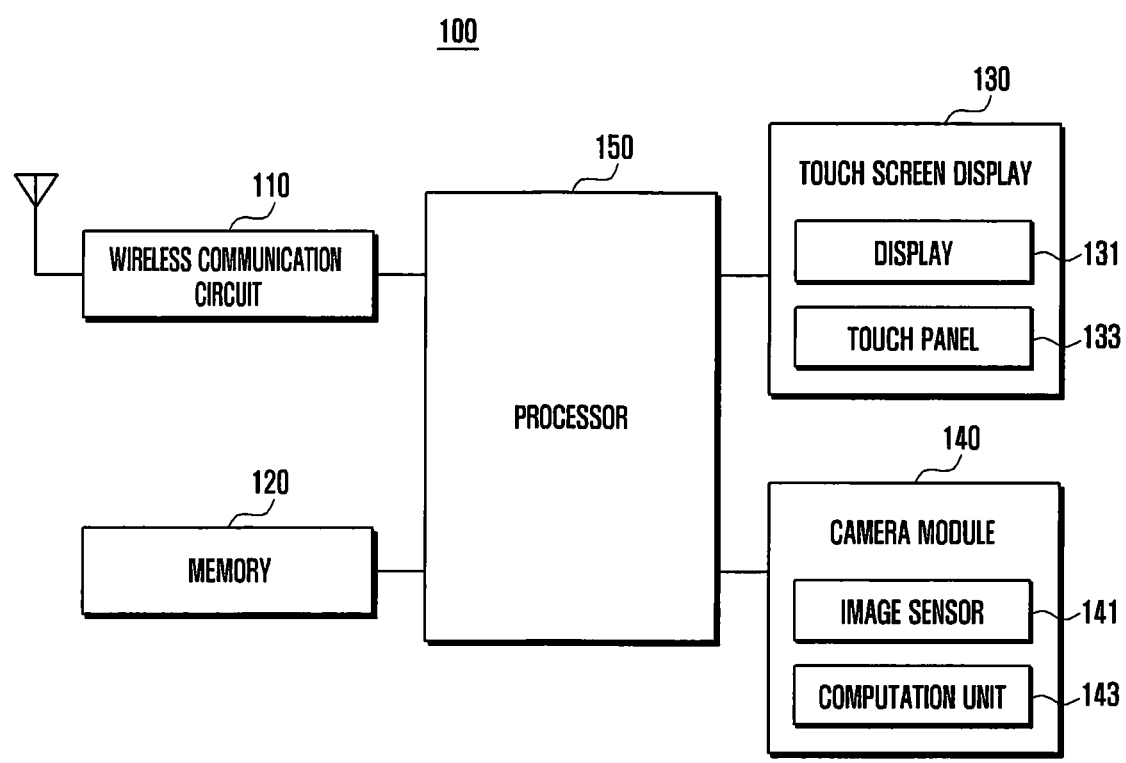
FIG. 1 is a block diagram of an electronic device according to various embodiments of the disclosure.

Hereinafter, the present disclosure will be described with reference to the accompanying drawings. However, various embodiments of the present disclosure are not limited to a specific implementation form and it should be understood that the present disclosure includes all modifications and/or equivalents and alternatives included in the spirit and scope of various embodiments of the present disclosure. In connection with descriptions of the drawings, similar components may be designated by the same reference numeral.

In the present disclosure, terms such as "include", "have", "may include", and "may have" may be construed to denote a certain characteristic, number, step, operation, element, component, or a combination thereof, but may not be construed to exclude the existence of or a possibility of addition of one or more other characteristics, numbers, steps, operations, elements, components, or combinations thereof.

In the present disclosure, the expressions "or" or "at least one of A or/and B" include any or all of combinations of words listed together. The expressions "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component (for example, a first component) is "coupled to" or "connected to" another component (for example, a second component), the component may be directly coupled to the another component, or coupled to the another component through a new component (for example, a third component). In contrast, when it is stated that a component (for example, a first component) is "directly coupled to" or "directly connected to" another component (for example, a second component), a new component (for example, a third component) does not exist between the component and another component.

According to embodiments of the present disclosure, when it is stated that a component is "directly coupled to" or "directly connected to" another component, a new component does not exist between the component and another component. In the present disclosure, the expression "configured (or set) to do" may be used interchangeably with, for example, "suitable for doing," "having the capacity to do," "designed to do," "adapted to do," "made to do," or "capable of doing." The expression "configured (or set) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor, such as an embedded processor or a generic-purpose processor, such as a central processing unit (CPU) or application processor that may execute one or more software programs stored in a memory device to perform corresponding functions.

The terms used in describing various embodiments of the present disclosure are only examples for describing a specific embodiment but do not limit the various embodiments of the present disclosure. Singular forms are intended to include plural forms unless the context clearly indicates otherwise. Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

According to embodiments of the present disclosure, examples of the electronic device may include a smartphone, a tablet personal computer (PC), a mobile phone, a video phone, an electronic book reader, a desktop PC, a laptop PC, a netbook computer, a workstation, a server, a personal digital assistant (PDA), a portable multimedia player (PMP), an MP3 player, a medical device, a camera, and a wearable device. Examples of the wearable device may include an accessory type device (such as, watch, ring, bracelet, ankle bracelet, necklace, glasses, contact lens, and head-mounted device (HMD), a textile or clothes type device such as electronic clothes, a body-attached type such as a skin pad and tattoo, and a bio-implemented type.

According to some embodiments, the electronic device may be a smart home appliance. The smart home appliance may include at least one of a TeleVision (TV), a Digital Video Disk (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame.

According to an embodiment, examples of the electronic device may include a medical device (such as portable medical sensors (including glucometer, heart rate sensor, tonometer, and body thermometer), magnetic resonance angiography (MRA) device, magnetic resonance imaging (MRI) device, computed tomography (CT) device, camcorder, and microwave scanner), a navigation device, a global navigation satellite system (GNSS), an event data recorder (EDR), a flight data recorder (FDR), an automotive infotainment device, marine electronic equipment (such as marine navigation system and gyro compass), aviation electronics (avionics), an automotive head unit, an industrial or household robot, an automated teller machine (ATM), a point of sales (POS) terminal, and an Internet-of-Things (IoT) device, such as an electric light bulb, sensor, sprinkler system, fire alarm system, temperature controller, street lamp, toaster, fitness equipment, hot water tank, heater, and boiler.

According to an embodiment of the present disclosure, examples of the electronic device may include furniture, a building/structure, a part of a vehicle, an electronic board, an electronic signature receiving device, a projector, and a sensor (such as water, electricity, gas, and electric wave meters). The electronic device may be flexible or a combination of at least two of the aforementioned devices, but the electronic device is not limited to the aforementioned devices.

Hereinafter, an electronic device according to various embodiments of the present disclosure will be described with reference to the accompanying drawings. The term "user" used in various embodiments may refer to a person who uses an electronic device or a device (for example, an artificial intelligence electronic device) which uses an electronic device.

FIG. 1 is a block diagram of an electronic device according to various embodiments of the disclosure.

Referring to FIG. 1, the electronic device 100 may include a wireless communication circuit 110, a memory 120, a touch screen display 130, a camera module 140, and a processor 150.

According to various embodiments of the disclosure, the wireless communication circuit 110 may establish communication between the electronic device 100 and an external electronic device.

According to various embodiments of the disclosure, the memory 120 may store a program for controlling the camera module 140 according to an operating mode (e.g., sensor mode and photographing mode) of the camera module 140.

According to various embodiments of the disclosure, the memory 120 may store information on an external object (e.g., location information and/or motion information of an external object) received from the camera module 140.

According to various embodiments of the disclosure, the touch screen display 130 may be configured in an integrated form including a display 131 and a touch panel 133.

According to various embodiments of the disclosure, the touch screen display 130 may display image data for an external object, obtained from the camera module 140, in a preview image form when the camera module 140 operates in the photographing mode.

According to various embodiments of the disclosure, the camera module 140 may include an image sensor 141 and a computation unit 143. The camera module 140 may differently control the image sensor 141 based on an operating mode (e.g., sensor mode and photographing mode).

According to various embodiments of the disclosure, the image sensor 141 may be configured with a plurality of pixels. Furthermore, each of the plurality of pixels may include a plurality of light receiving units (e.g., at least two photodiodes).

According to various embodiments of the disclosure, when the camera module 140 operates in the sensor mode, the computation unit 143 may recognize an external object using a plurality of light receiving units included in each of a plurality of pixels configuring the image sensor 141, and may generate image data for the recognized external object.

For example, the computation unit 143 may identify phase difference information for an external object using a plurality of light receiving units included in each of a plurality of pixels configuring the image sensor 141. For example, the computation unit 143 may identify phase difference information for each of the plurality of pixels, and may identify location information of the external object based on the identified phase difference information. The computation unit 143 may provide the location information to the external processor (e.g., the electronic device 100 of the processor 150 of FIG. 1) of the camera module 140 connected to the computation unit 143.

According to various embodiments of the disclosure, when the camera module 140 operates in the photographing mode, it may activate all the pixels of the image sensor 141 or only a selected pixel of the image sensor 141 based on an attribute value (e.g., frame rate and/or resolution) of an identified image, under the control of the processor 150. For example, the camera module 140 may generate image data for an external object using an optical signal obtained from all the pixels or a selected pixel of the image sensor 141 activated under the control of the processor 150.

According to various embodiments of the disclosure, the processor 150 may control an overall operation of the electronic device 100 and a signal flow between the internal elements of the electronic device 100, may perform data processing, and may control the supply of power from the battery to the elements.

According to various embodiments of the disclosure, when the camera module 140 operates as a sensor for detecting (recognizing) an external object, the processor 150 may obtain location information of the external object from the computation unit 143 of the camera module 140.

According to various embodiments of the disclosure, when the camera module 140 operates in the photographing mode for photographing an external object, the processor 150 may control to activate all the pixels or only a selected pixel of the image sensor 141 configuring the camera module 140. The processor 150 may generate image data for the external object using an optical signal obtained from all the activate pixels or selected pixel of the image sensor 141. Furthermore, the processor 150 may control the touch screen display 130 to display the generated image data in a preview image form.

Figure 2:
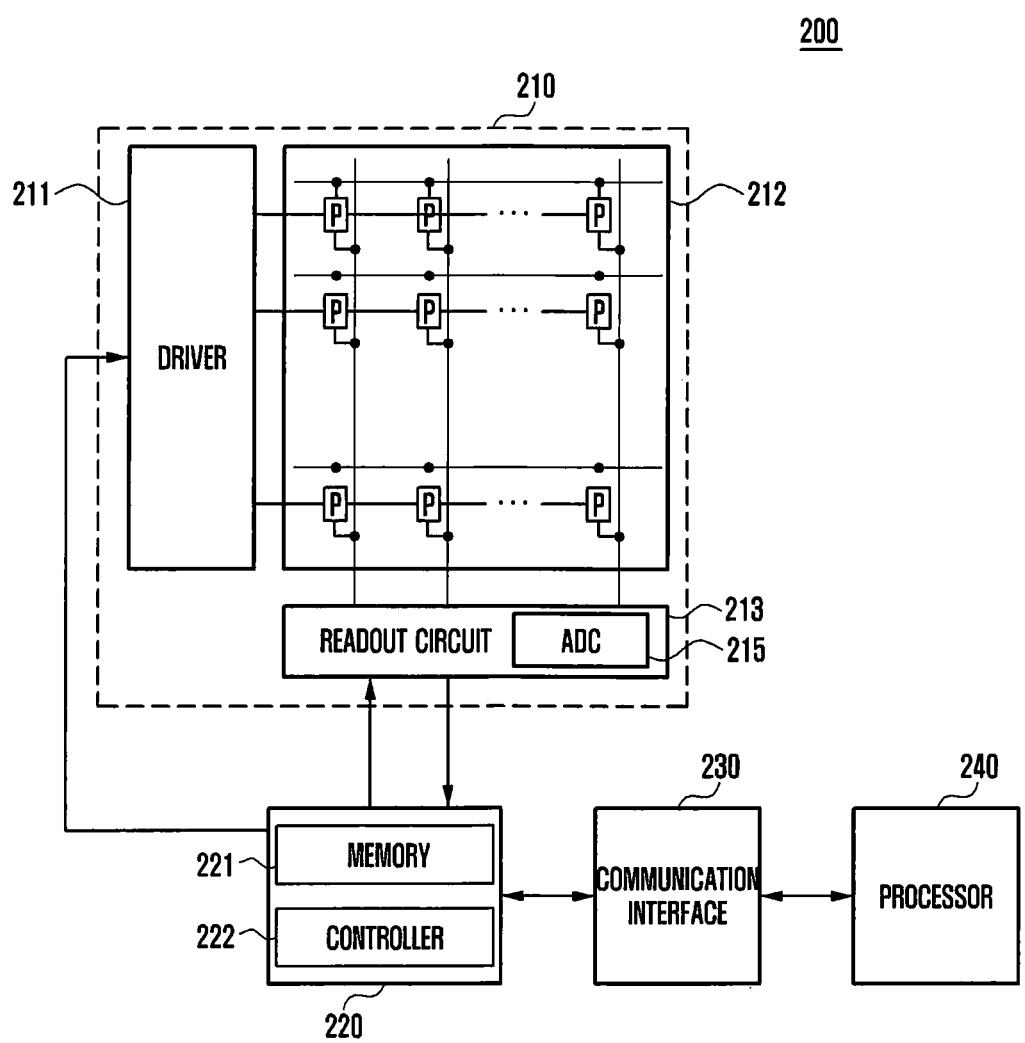
FIG. 2 is a block diagram of an image sensor according to various embodiments of the disclosure.

FIG. 2 is a block diagram of an image sensor according to various embodiments of the disclosure.

Referring to FIG. 2, the image sensor 200 (e.g., the image sensor 141 of FIG. 1) may include an analog block 210, a digital control block 220, and a communication interface 230.

According to various embodiments of the disclosure, the image sensor 200 may be an element of a camera module (e.g., the camera module 140 of FIG. 1) included in an electronic device (e.g., the electronic device 100 of FIG. 1), and may generate image data and transmit it to the processor 240 (e.g., an image signal processor (ISP)).

According to various embodiments of the disclosure, the analog block 210 may convert light, received through a lens, into an electrical signal, and may output the electrical signal to the digital control block 220. For example, the analog block 210 may include a driver 211, a pixel array 212, and a readout circuit 213.

According to various embodiments of the disclosure, the driver 211 may control the pixel array 212 in a row unit, for example. The driver 211 may output a control signal (e.g., selection signal, reset signal, and transmission signal) to the pixel array 212.

According to various embodiments of the disclosure, the pixel array 212 may be configured with a plurality of unit pixels. Each of the unit pixels may include a plurality of sub-pixels, for example, a plurality of light receiving units (e.g., at least two photodiodes). The image sensor 200 may output color information, including at least one piece of color information of read (R), green (G) or blue (B).

According to various embodiments of the disclosure, the readout circuit 213 may store, sense, amplify and/or output a signal output from the pixel array 212.

According to various embodiments of the disclosure, the readout circuit 213 may sequentially select a plurality of column lines one by one, may receive an electrical signal from a selected column line, and may output the received electrical signal to the digital control block 220.

According to various embodiments of the disclosure, the readout circuit 213 may include an analog-to-digital converter (ADC) 215 configured to convert an electrical signal, received from a selected column line, into pixel data and to output the pixel data. The ADC 215 may be included in the digital control block 220 or may be included as a separate element.

According to various embodiments of the disclosure, the digital control block 220 may generate a single image datum by combining pixel data sequentially received from the readout circuit 213. Furthermore, the digital control block 220 may identify phase difference information for an external object based on a plurality of image data. For example, the digital control block 220 may identify phase difference information for an external object using a plurality of light receiving units configuring respective sub-pixels. Furthermore, the digital control block 220 may identify location information of the external object based on the phase difference information.

According to various embodiments of the disclosure, the processor 240 may control the image sensor 200 or the controller 222 using an inter-integrated circuit (I2C), for example.

According to various embodiments of the disclosure, the digital control block 220 may output image data and phase difference information to a processor 240 through the communication interface 230.

According to various embodiments of the disclosure, the digital control block 220 may further include a controller 222 configured to control the analog block 210, the ADC 215, and a memory 221.

According to various embodiments of the disclosure, the controller 222 may control an operation (e.g., a reset operation (e.g., an operation of outputting a reset signal to pixels that belong to pixels and that correspond to an i-th column), a transmission operation (e.g., an operation of outputting a transmission signal to pixels that belong to pixels and that correspond to an i-th column, and a row line selection operation (e.g., an operation of outputting a selection signal pixels that belong to pixels and that correspond to an i-th column)) of the driver 211.

According to various embodiments of the disclosure, the memory 221 may store various commands necessary for operations of the image sensor 200.

According to various embodiments of the disclosure, the controller 222 may generate a single image datum by combining pixel data sequentially received from the readout circuit 213, and may store the single image datum in the memory 221.

According to various embodiments of the disclosure, the controller 222 may output image data and phase difference information, stored in the memory 221, to the processor 240 through the communication interface 230.

According to various embodiments of the disclosure, the controller 222 may control an operation of the image sensor 200 based on an operating mode of the camera module. For example, the operating mode of the camera module may include the sensor mode and the photographing mode.

According to various embodiments of the disclosure, the sensor mode of the camera module is for recognizing an external object, and may include a high sensitivity, low power, low pixel and/or low-bit ADC. Furthermore, the photographing mode of the camera module is for displaying a preview screen for photographing an external object on a display (e.g., the touch screen display 130 of FIG. 1), and may include a high picture-quality, high power, high pixel and/or high-bit ADC.

According to various embodiments of the disclosure, when the camera module operates in the sensor mode, the controller 222 may control the image sensor 200 to activate only some pixels of the pixel array 212. The image sensor 200 may generate image data using an optical signal obtained from the activated some pixels.

According to various embodiments of the disclosure, when the camera module operates in the photographing mode, the controller 222 may control the image sensor 200 to activate all the pixels of the pixel array 212 or only a selected pixel of the pixel array 212 based on an attribute value (e.g., frame rate and/or resolution) of an identified image. The image sensor 200 may generate image data using an optical signal obtained from the activated all the pixels or selected pixel.

According to various embodiments of the disclosure, the communication interface 230 may connect the digital control block 220 to the processor 240 through at least one data line, and may transmit an instruction of the processor 240 to the digital control block 220.

According to various embodiments of the disclosure, the communication interface 230 may output location information of an external object, identified by the digital control block 220, to the processor 240. The communication interface 230 may be implemented using a serial communication method. For example, serial communication between the digital control block 220 and the processor 240 may support a mobile industry processor interface (MIPI) communication method.

According to various embodiments of the disclosure, the processor 240 may provide location information of an external object to an external processor (e.g., the processor 150 of FIG. 1) of the camera module.

Figure 3:
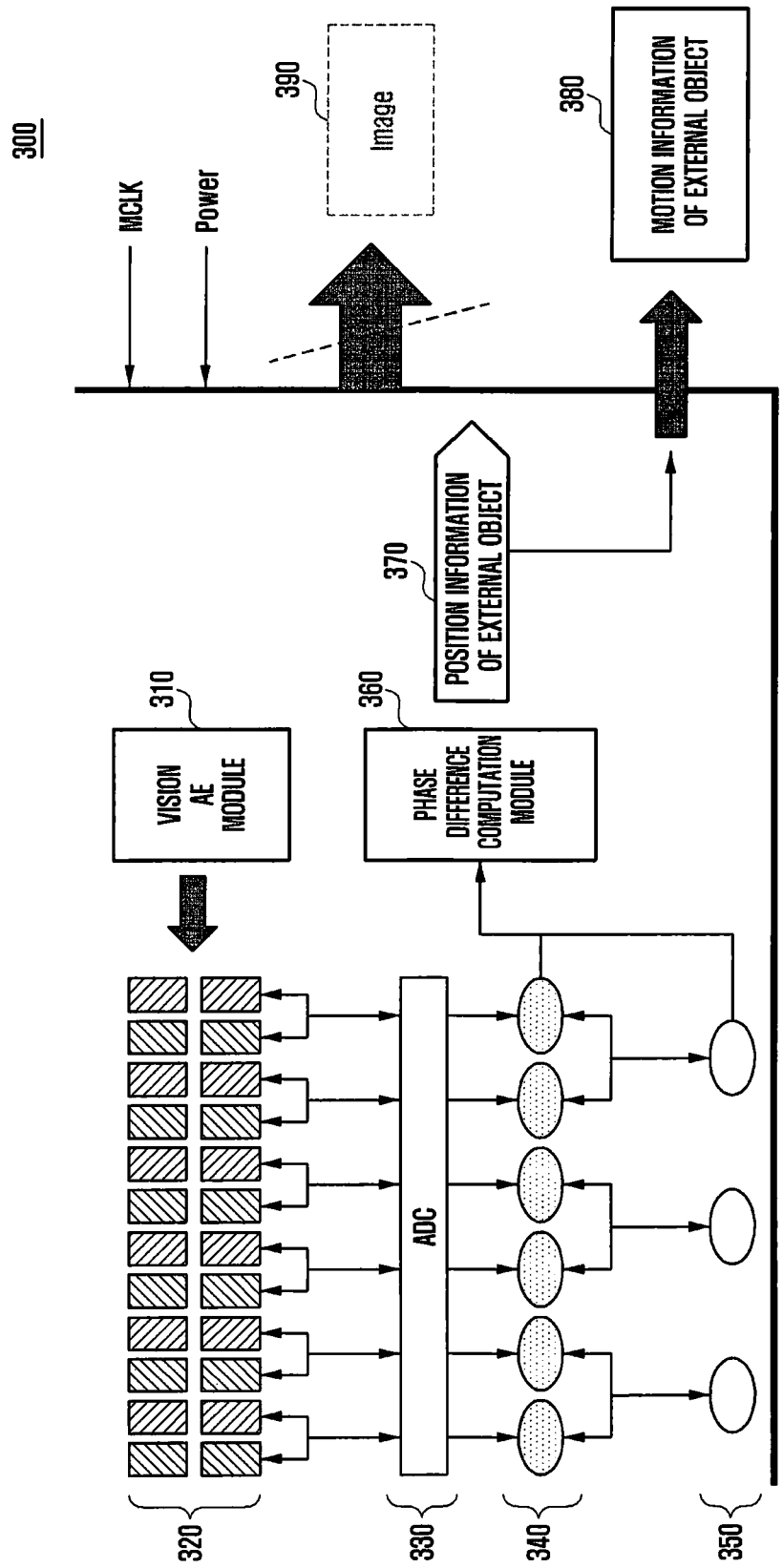
FIG. 3 is a block diagram embodying an image sensor according to various embodiments of the disclosure.

FIG. 3 is a block diagram embodying an image sensor according to various embodiments of the disclosure.

Referring to FIG. 3, an image sensor 300 (e.g., the image sensor 200 of FIG. 2) may include a vision auto exposure (AE) module 310, a pixel array 320 (e.g., the pixel array 212 of FIG. 2), an ADC 330 (e.g., the ADC 215 of FIG. 2), and a phase difference computation module 360.

According to various embodiments of the disclosure, the image sensor 300 may control the exposure of a recognized external object using the vision AE module 310. For example, the vision AE module 310 may adjust the exposure time, exposure sensitivity, etc. of the pixel array 320 for recognizing an external object based on collected context (e.g., surrounding illumination information).

According to various embodiments of the disclosure, the pixel array 320 may be configured with a plurality of unit pixels. Each of the unit pixel may include a plurality of light receiving units (e.g., at least two photodiodes).

According to various embodiments of the disclosure, the image sensor 300 may output a signal, obtained from pixels including a plurality of light receiving units (e.g., at least two photodiodes) whose exposure time, exposure sensitivity, etc. have been adjusted, to the ADC 330.

According to various embodiments of the disclosure, the ADC 330 may operate with low power. For example, when the camera module (e.g., the camera module 140 of FIG. 1) operates in the sensor mode, it may not require an image of high resolution (e.g., 10 bits) according to the photographing mode of the camera module because it performs only an operation of recognizing an external object. Accordingly, the ADC 330 may operate with low power.

According to various embodiments of the disclosure, the image sensor 300 may identify phase difference information for an external object using image data, generated by a plurality of light receiving units, for example, a plurality of photodiodes, through the ADC 330. For example, the image sensor 300 may obtain phase difference information 340 of high resolution by adding up the generated phase difference information. For example, when it becomes dark, image data obtained from a plurality of light receiving units may not be distinguished because noise is increased. Accordingly, the image sensor 300 may obtain the phase difference information 340 of high resolution by adding up phase difference information. Furthermore, the image sensor 300 may obtain phase difference information 350 of high sensitivity by adding up the obtained phase difference information 340 of high resolution. As the phase difference information 350 of high sensitivity is obtained, the image sensor 300 can precisely identify phase difference information for an external object because it can have a high sensitivity characteristic even in low illumination.

According to various embodiments of the disclosure, the phase difference computation module 360 may compute a phase difference for the external object based on the obtained phase difference information 350 of high sensitivity. The image sensor 300 may identify location information 370 of the external object based on the computed the phase difference, and may provide the location information to a processor (e.g., the processor 240 of FIG. 2).

According to various embodiments of the disclosure, the image sensor 300 may obtain movement information 380 for the external object based on the location information 370 of the external object. The image sensor 300 may provide a processor (e.g., the processor 240 of FIG. 2) with the obtained movement information 380 for the external object. For example, the movement information may include at least one of the distance between the external object and the image sensor 300 or a moving speed of the external object.

According to various embodiments of the disclosure, the processor (e.g., the processor 240 of FIG. 2) may provide an external processor (e.g., the processor 150 of FIG. 1) with the received location information 370 of the external object and/or the obtained movement information 380 of the external object.

According to various embodiments of the disclosure, an electronic device (e.g., the electronic device 100 of FIG. 1) may perform a control function of the electronic device based on location information and/or movement information of the external object received from a processor (e.g., the processor 240 of FIG. 2). Accordingly, the electronic device may recognize an external object or a motion of the external object with low power, and thus an electronic device can be controlled without a direct input from a user.

According to various embodiments of the disclosure, when the camera module operates in the photographing mode (e.g., switches from the sensor mode to the photographing mode), the image sensor 300 may provide an external processor (e.g., the processor 150 of FIG. 1) with generated image data so that the generated image data is displayed (390) on a display (e.g., the touch screen display 130 of FIG. 1).

Figure 4:
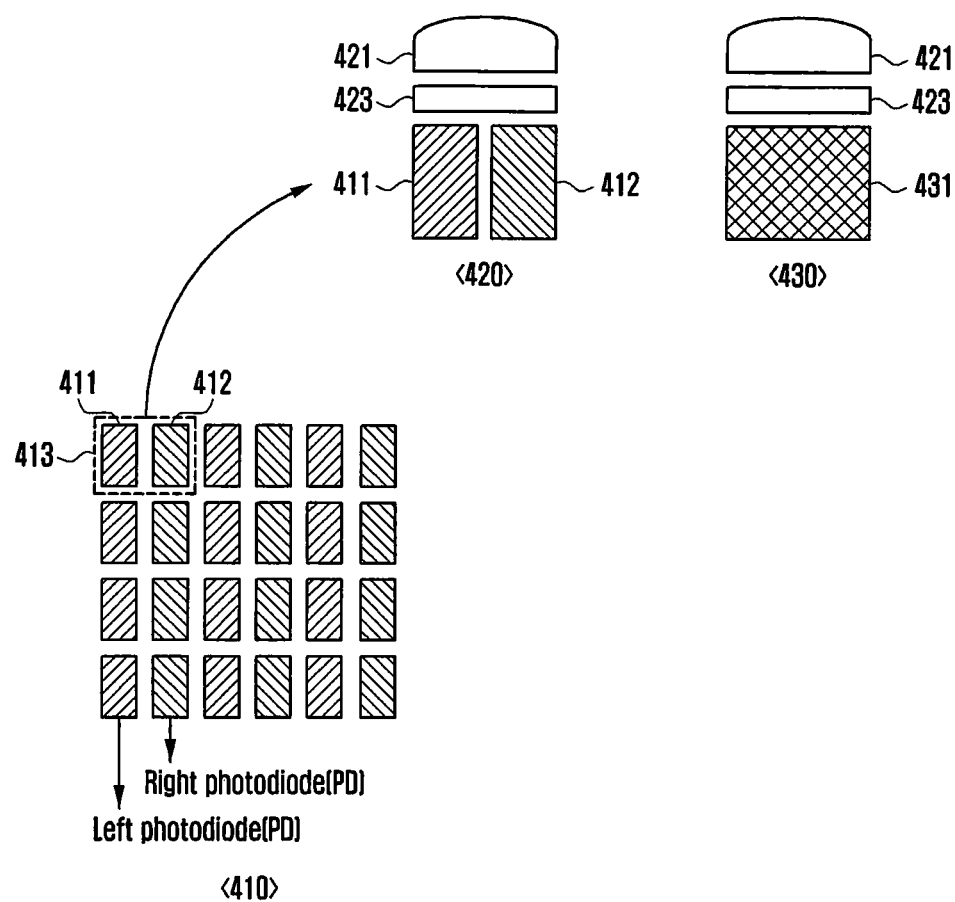
FIG. 4 is a schematic diagram of a unit pixel including a plurality of light receiving units in the image sensor according to various embodiments of the disclosure.

FIG. 4 is a schematic diagram of a unit pixel including a plurality of light receiving units in the image sensor according to various embodiments of the disclosure.

Referring to FIG. 4, an image sensor (e.g., the image sensor 300 of FIG. 3) may configure a plurality of unit pixels, and may use a pixel array (e.g., the pixel array 320 of FIG. 3) in which a plurality of unit pixels is arranged in given columns and rows in order to obtain image data for an external object.

Referring to <410> of FIG. 4, the pixel array of the image sensor may be configured with a plurality of unit pixels. Each of the unit pixels may include a plurality of light receiving units, for example, at least two photodiodes (e.g., a left photodiode 411 and a right photodiode 412).

Referring to <420> and <430> of FIG. 4, a unit pixel of the image sensor may include two photodiodes 411 and 412, a color filter 423, and a micro lens 421.

According to various embodiments of the disclosure, the micro lens 421 may be formed to correspond to the photodiodes 411 and 412 over the color filter 423 while maintaining a tilt angle at which the color filter 423 is stacked.

According to various embodiments of the disclosure, the color filter 423 may be a red (R) filter, a green (G) filter, a blue (B) filter or may be a yellow filter, a magenta filter, and a cyan filter.

According to various embodiments of the disclosure, the color filter 423 may be formed over the photodiodes 411 and 412 based on an incident angle of incident light, and may nave a Bayer pattern. In the Bayer pattern, in order to generate image data configured with dots by collecting the brightness and color of an external object, filters for receiving brightness of red (R), green (G), and blue (B) may be disposed on a two-dimensional plane. Each of unit pixels configuring a mesh under the Bayer pattern color filters does not recognize a natural color, but may recognize only an allocated color of red (R), green (G), blue (B) and deduce a natural color by interpolating the recognized color.

According to various embodiments of the disclosure, the image sensor may identify phase difference information for an external object using a plurality of light receiving units configuring one unit pixel. For example, referring to <420> of FIG. 4, the image sensor may identify phase difference information for an external object using the two photodiodes 411 and 412 configuring one unit pixel.

According to various embodiments of the disclosure, the image sensor may identify location information of the external object based on the identified phase difference information and phase difference information for the external object identified using a plurality of light receiving units configuring the other unit pixel.

According to various embodiments of the disclosure, as shown in <430> of FIG. 4, when an input for image capture is detected, the image sensor may generate a single image datum by combining two photodiodes (e.g., 411, 412) as in 431.

According to various embodiments of the disclosure, a unit pixel of an image sensor has been illustrated as including two photodiodes, but the disclosure is not limited thereto. A unit pixel of an image sensor may be configured with four photodiodes, for example.

Figure 5:
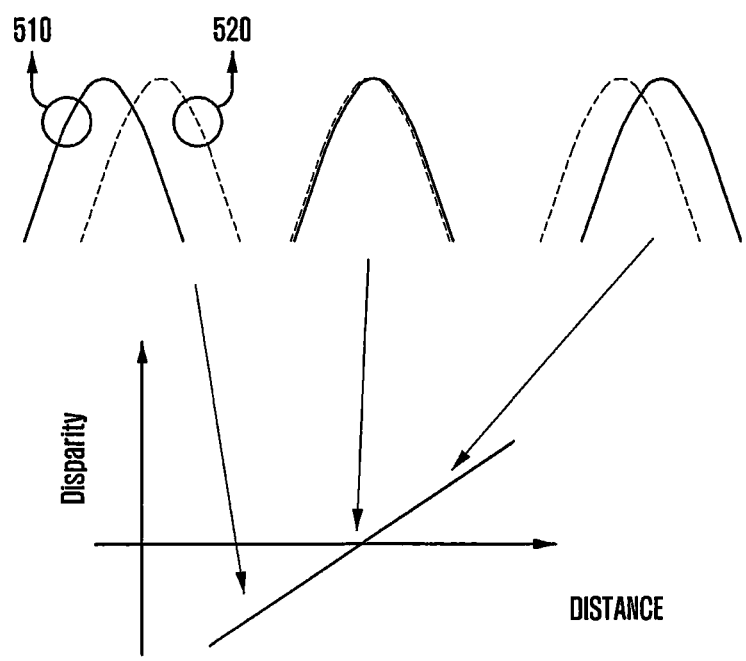
FIG. 5 is a diagram for illustrating a method of identifying phase difference information for an external object according to various embodiments of the disclosure.

FIG. 5 is a diagram for illustrating a method of identifying phase difference information for an external object according to various embodiments of the disclosure.

According to various embodiments of the disclosure, FIG. 5 is a graph showing a phase difference according to the distance between an image sensor (e.g., the image sensor 300 of FIG. 3) and an external object.

According to various embodiments of the disclosure, a camera module (e.g., the camera module 140 of FIG. 1) may obtain distance information between the image sensor and the external object based on phase difference information detected from a plurality of light receiving units included in each of a plurality of pixels configuring the image sensor, for example, at least two photodiodes.

According to various embodiments of the disclosure, a phase difference may occur between phase information 510 of one photodiode and phase information 520 of the other photodiode, among two photodiodes, based on the distance between the image sensor and the external object. For example, when the distance between the image sensor and the external object is smaller than a threshold, a phase difference may occur in the phase information 510 of one of the two photodiodes in a form in which the phase information 510 is positioned on the left of the phase information 520 of the other photodiode. Alternatively, when the distance between the image sensor and the external object corresponds to a threshold, a phase difference may not occur in a form in which the phase information 510 of one photodiode and the phase information 520 of the other photodiode are matched up. Alternatively, when the distance between the image sensor and the external object is greater than a threshold, a phase difference may occur in a form in which the phase information 510 of one of the two photodiodes is positioned on the right of the phase information 520 of the other photodiode.

According to various embodiments of the disclosure, the camera module may generate image data for a detected external object when the distance between the image sensor and the external object is smaller than a threshold.

According to various embodiments of the disclosure, the camera module may obtain distance information between the image sensor and an external object based on phase information detected from two photodiodes, and may identify whether a motion of the external object for performing a function for controlling an electronic device is detected.

Figure 6:
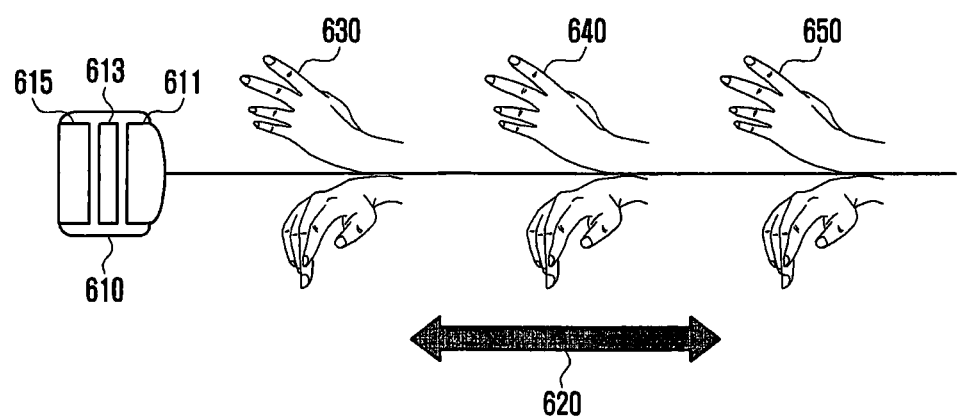
FIG. 6 is a diagram for illustrating a method of recognizing an external object according to various embodiments of the disclosure.

FIG. 6 is a diagram for illustrating a method of recognizing an external object according to various embodiments of the disclosure.

Referring to FIG. 6, a camera module (e.g., the camera module 140 of FIG. 1) may include a lens 611 (e.g., the micro lens 421 of FIG. 4), a filter 613 (e.g., the color filter 423 of FIG. 4), and an image sensor 615 (e.g., the image sensor 300 of FIG. 3).

According to various embodiments of the disclosure, the camera module may recognize an external object in the state in which the lens 611 has been fixed. The camera module may obtain an optical signal corresponding to the recognized external object through the image sensor 615. For example, the camera module may identify phase difference information for the external object using a plurality of light receiving units included in each of pixels configuring the pixel array of the image sensor 615, for example, at least two photodiodes. For example, the camera module may identify phase difference information for an external object based on at least a first photodiode (e.g., the left photodiode 411 of FIG. 4) and a second photodiode (e.g., the right photodiode 412 of FIG. 4) configuring the first light receiving units of a plurality of light receiving units and at least two photodiodes (e.g., a third photodiode and a fourth photodiode (not shown)) configuring the second light receiving units of the plurality of light receiving units. The camera module may obtain distance information between the lens 611 and the external object based on the identified phase difference information.

According to various embodiments of the disclosure, the camera module may store the distance information in a memory (e.g., the memory 221 of FIG. 2).

According to various embodiments of the disclosure, the camera module may detect that the distance between the lens 611 and an external object is changed (620) as the external object moves. The camera module may store distance change information according to a motion of the external object in a memory (e.g., the memory 221 of FIG. 2). The camera module may identify that a motion of the external object has occurred based on distance change information 630, 640, and 650, and may provide it to an external processor (e.g., the processor 150 of FIG. 1).

Figure 7A:
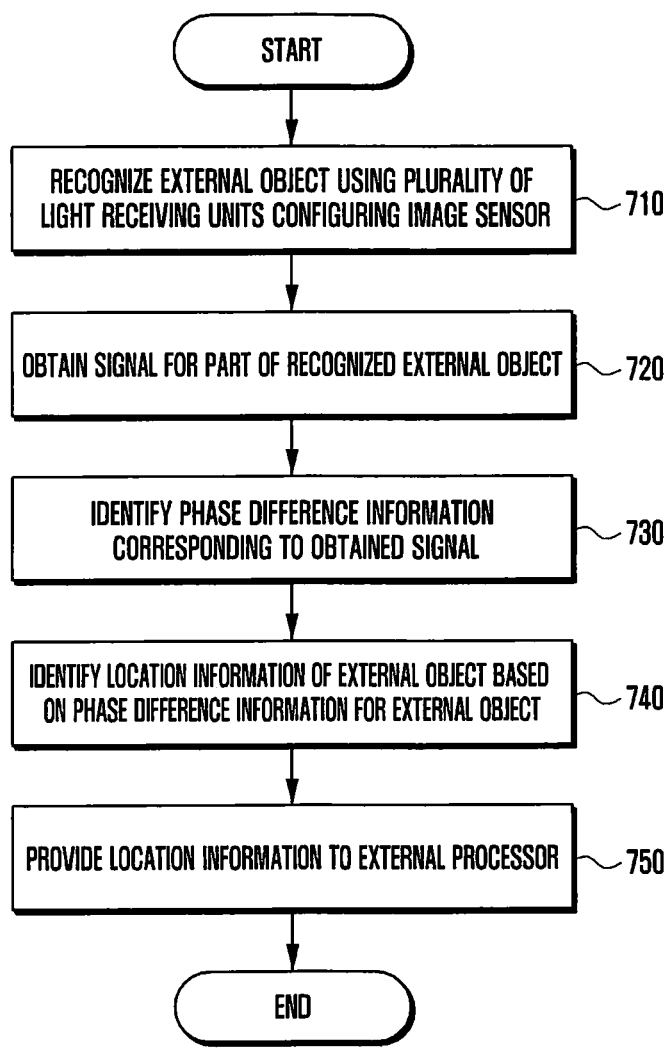
FIG. 7A is a diagram for illustrating a method of recognizing an external object using the image sensor according to various embodiments of the disclosure.

FIG. 7A is a diagram for illustrating a method of recognizing an external object using the image sensor according to various embodiments of the disclosure.

Referring to FIG. 7A, at operation 710, a camera module (e.g., the camera module 140 of FIG. 1) may recognize an external object using a plurality of light receiving units configuring the image sensor.

According to various embodiments of the disclosure, the camera module may control the exposure of the recognized external object using a vision AE module (e.g., the vision AE module 310 of FIG. 3). For example, the vision AE module may adjust the exposure time, exposure sensitivity, etc. of a pixel array (e.g., the pixel array 320 of FIG. 3) for recognizing the external object based on collected context (e.g., surrounding illumination information).

According to various embodiments of the disclosure, the camera module may operate in a bining mode in which only some pixels adjusted through the vision AE module are driven. The camera module may recognize the external object using only the driven some pixels in the bining mode.

According to various embodiments of the disclosure, the camera module may operate as a sensor for recognizing (detecting) an external object. An image sensor included in the camera module may be configured with a plurality of unit pixels. Each unit pixel may include a plurality of sub-pixels, for example, a plurality of light receiving units. The camera module may recognize an external object based on optical information obtained from a plurality of light receiving units.

According to various embodiments of the disclosure, when the camera module operates as a sensor for recognizing an external object, the camera module may identify the number of output bits of a signal converter and resolution and the number of frames of image data for a recognized external object in such a way as to be optimized to recognize the external object. For example, the camera module may identify resolution, an exposure time, a gain, a frame, etc., and may operate in the sensor mode in which an external object, such as high sensitivity, low power, a low pixel, and a low bit ADC, is recognized. Accordingly, according to various embodiments of the disclosure, the image sensor can recognize an external object rapidly with low power.

According to various embodiments of the disclosure, the camera module may convert light, received through the lens, into an electrical signal, may output the electrical signal as a digital signal through an ADC, and may generate a single image datum by combining sequentially received pixel data through the ADC.

According to various embodiments of the disclosure, at operation 720, the camera module may obtain a signal for part of the recognized external object.

According to various embodiments of the disclosure, the camera module may obtain a first signal corresponding to the first part of an external object using pixels configuring an image sensor, for example, a plurality of light receiving units included in a first pixel, for example, a plurality of first light receiving units. Furthermore, the camera module may obtain a second signal corresponding to the second part of the external object using pixels configuring an image sensor, for example, a plurality of light receiving units included in a second pixel, for example, a plurality of second light receiving units.

According to various embodiments of the disclosure, at operation 730, the camera module may identify phase difference information corresponding to the obtained signal. For example, the camera module may identify phase difference information for the external object using a plurality of light receiving units included in each pixel, for example, at least two photodiodes through the ADC.

According to various embodiments of the disclosure, the camera module may identify first phase difference information corresponding to the first signal obtained at operation 720 and second phase difference information corresponding to the second signal obtained at operation 720.

According to various embodiments of the disclosure, at operation 740, the camera module may identify location information of the external object based on the phase difference information for the external object.

According to various embodiments of the disclosure, the camera module may set a specific area of the external object in the generated image data for the external object as a region of interest (ROI). For example, if an external object is a person, the camera module may recognize a face or hand and set an ROI. The camera module may perform at least one of a focus, crop, a change in picture quality, or exposure adjustment based on the set ROI. The camera module may identify location information of the set ROI.

According to various embodiments of the disclosure, the camera module may detect a motion of the external object based on the identified phase difference information. For example, the camera module may identify phase difference information based on a plurality of image data obtained from a plurality of light receiving units, and may store the phase difference information in a memory (e.g., the memory 221 of FIG. 2).

According to various embodiments of the disclosure, the camera module may obtain distance information between an image sensor and an external object based on phase difference information detected by a plurality of light receiving units of an image sensor, for example, at least two photodiodes. The camera module may identify a motion of the external object based on the obtained distance information. When a motion of the external object is detected, the camera module may obtain motion information including at least one of a motion direction or speed of the external object.

According to various embodiments of the disclosure, the camera module may obtain motion information of the ROI based on the location information of the set ROI.

According to various embodiments of the disclosure, at operation 750, the camera module may provide the location information (or the set ROI) of the external object to an external processor (e.g., the processor 150 of FIG. 1). Furthermore, the camera module may provide motion information for a motion of the external object (or the set ROI) to an external processor (e.g., the processor 150 of FIG. 1).

Figure 7B:
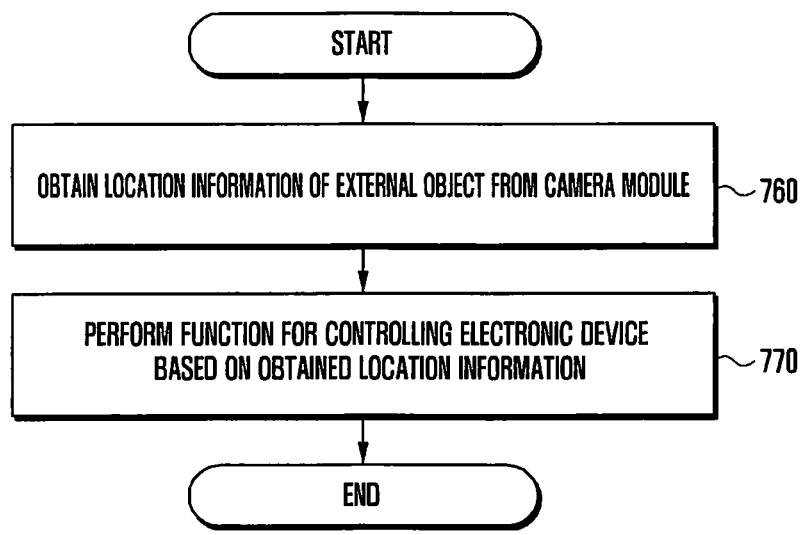
FIG. 7B is a diagram for illustrating a method of performing a function of the electronic device using location information of an external object according to various embodiments of the disclosure.

FIG. 7B is a diagram for illustrating a method of performing a function of the electronic device using location information of an external object according to various embodiments of the disclosure.

Referring to FIG. 7B, at operation 760, an electronic device (e.g., the electronic device 100 of FIG. 1) may obtain location information of an external object from a camera module (e.g., the camera module 140 of FIG. 1). For example, the electronic device may obtain an external object (or a specific area (e.g., ROI) of the external object) detected in image data and location information of the external object.

According to various embodiments of the disclosure, it has been assumed that location information of the external object is received, but the disclosure is not limited thereto. An electronic device may also obtain motion information of the external object.

According to various embodiments of the disclosure, at operation 770, the electronic device may perform a function for controlling the electronic device based on the location information (and/or motion information) of the external object.

For example, when a call is received, an electronic device may perform a function for controlling the electronic device, for example, answering the phone or refusing the phone based on location information and/or motion information of an external object recognized through the camera module.

According to various embodiments of the disclosure, if a function for controlling the electronic device is to play back music, the function may include functions, such as volume up, volume down, the playback of a previous song, and the playback of a next song.

According to various embodiments of the disclosure, a function for controlling the electronic device is to play back a photo, the function may include zoom in, zoom out, the playback of a previous image, and the playback of a next image.

FIG. 8 is a diagram for illustrating an example in which the image sensor is used according to various embodiments of the disclosure.

Referring to FIG. 8, as shown in <810>, a camera module (e.g., the camera module 140 of FIG. 1) provided at the front of an electronic device (e.g., the electronic device 100 of FIG. 1) may operate as illumination sensor and a proximity sensor in addition to the photographing mode for photographing an external object. For example, a camera module 811 provided at the front of an electronic device may detect whether an external object is proximate. When the proximity of the external object is detected, the camera module may provide corresponding information (e.g., location information of the external object and/or motion information of the external object) to the electronic device. The electronic device may perform a corresponding function, for example, a function for turning off the display (e.g., the touch screen display 130 of FIG. 1) of the electronic device based on information on the external object received from the camera module.

According to various embodiments of the disclosure, as shown in <820> and <830> of FIG. 8, a user may perform a gesture for manipulating a function (e.g., navigator) of the electronic device, while driving a car or riding a bicycle. A camera module 821, 831 provided at the front of the electronic device may recognize an external object, for example, a hand of the user, and may detect a gesture based on a motion of the recognized hand. The camera module 821, 831 may provide information on the detected gesture to the electronic device. The electronic device may perform a function of the electronic device corresponding to the gesture, for example, a function (e.g., a change in a screen displayed on a display, volume up, volume down, or map search) for manipulating a navigator based on the information on the gesture received from the camera module.

Figure 9:
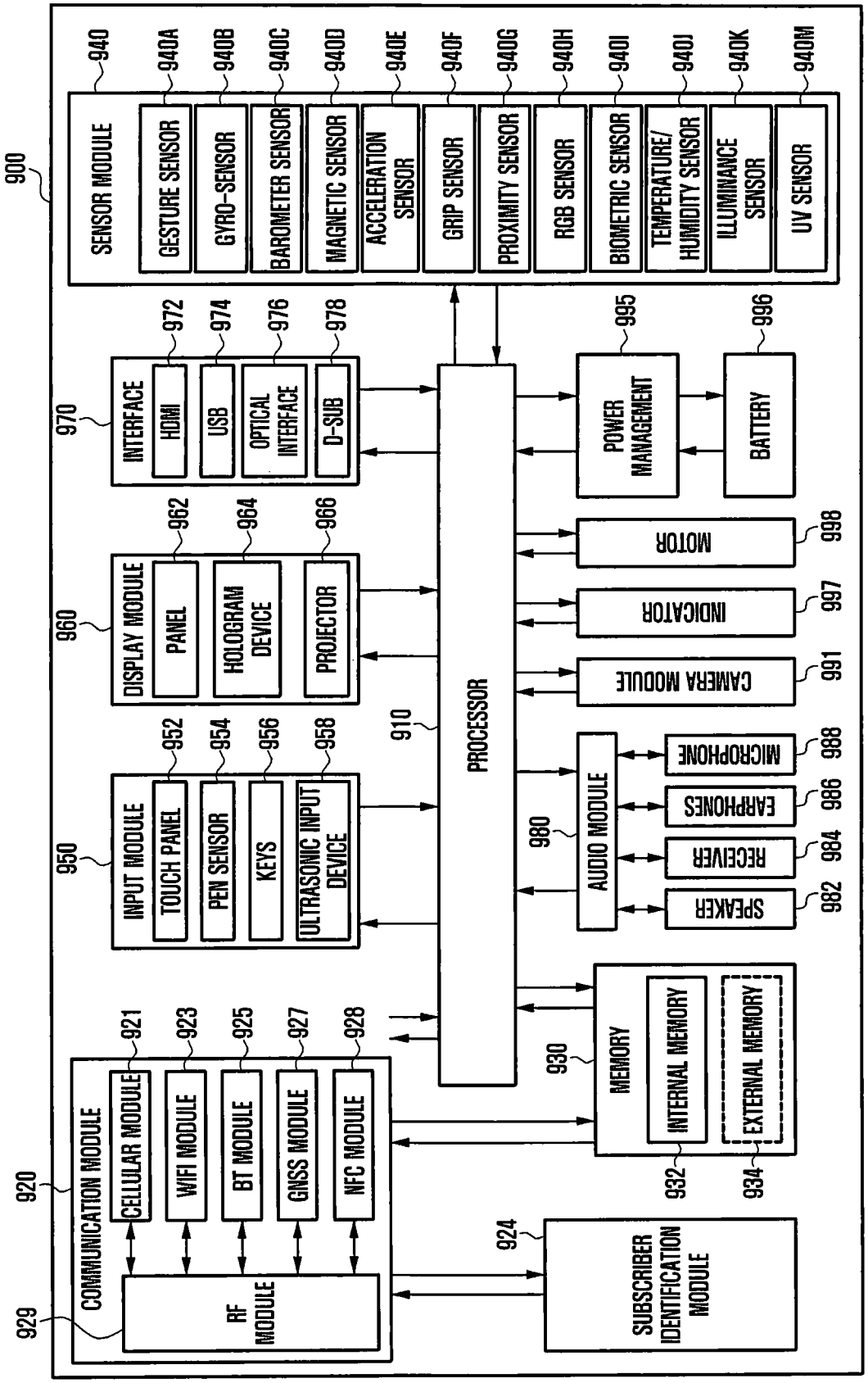
FIG. 9 is a block diagram of the electronic device according to various embodiments of the disclosure.

FIG. 9 is a block diagram of an electronic device according to various embodiments of disclosure.

Referring to FIG. 9, an electronic device 901 may configure all or a part of the electronic device 100 illustrated in FIG. 1. The electronic device 901 includes one or more APs 910, a communication module 920, a subscriber identification module (SIM) card 924, a memory 930, a sensor module 940, an input device 950, a display module 960, an interface 970, an audio module 980, a camera module 991, a power management module 995, a battery 996, an indicator 997, and a motor 998. The processor 910 operates an OS or an application program so as to control a plurality of hardware or software component elements connected to the processor 910 and execute various data processing and calculations including multimedia data. The processor 910 may be implemented by a system on chip (SoC), for example. According to an embodiment, the processor 910 may further include a graphics processing unit (GPU) and/or image signal processor. The processor 910 may include at least one portion of components, such as a cellular module 921. The processor 910 may load command or data received from at least one of another component, such as a non-volatile memory, and store various data in the non-volatile memory.

The communication module 920 may include same or similar components with a wireless communication circuit 110 of FIG. 1, and may include the cellular module 921, a Wi-Fi module 923, a BT module 925, a GPS module 927, a NFC module 928, and a radio frequency (RF) module 929. The cellular module 921 provides a voice, a call, a video call, a short message service (SMS), or an Internet service through a communication network, such as LTE, LTE-A, CDMA, WCDMA, UMTS, WiBro, or GSM. The cellular module 921 may distinguish and authenticate electronic devices within a communication network by using a subscriber identification module (e.g., SIM card) 924. According to an embodiment, the cellular module 921 performs at least some of the functions which may be provided by the processor 910. For example, the cellular module 921 may perform at least some of the multimedia control functions, and may include a CP. Each of the Wi-Fi module 923, the BT module 925, the GNSS module 927, and the NFC module 928 may include, for example, a processor for processing data transmitted/received through the corresponding module. Although the cellular module 921, the Wi-Fi module 923, the BT module 925, the GNSS module 927, and the NFC module 928 are at least two of the cellular module 921, the W-Fi module 923, the BT module 925, the GNSS module 927, and the NFC module 928 may be included in one integrated chip (IC) or one IC package according to one embodiment. The RF module 929 transmits/receives data, such as an RF signal and may include, for example, a transceiver, a power amp module (PAM), a frequency filter, a low noise amplifier (LNA), and antenna. Although the cellular module 921, the W-Fi module 923, the BT module 925, the GNSS module 927, and the NFC module 928 share one RF module 929 in FIG. 92, at least one of the cellular module 921, the Wi-Fi module 923, the BT module 925, the GNSS module 927, and the NFC module 928 may transmit/receive an RF signal through a separate RF module according to one embodiment. The subscriber identification module 924 includes a SIM and may be inserted into a slot formed in a particular portion of the electronic device. The subscriber identification module 224 includes unique identification information, such as an integrated circuit card identifier (ICCID) or subscriber information, such as an international mobile subscriber identity (IMSI).

The memory 930 may include an internal memory 932 or an external memory 934. The internal memory 932 may include, for example, at least one of a volatile memory, such as, a random access memory (RAM), a dynamic RAM (DRAM), a static RAM (SRAM), and a synchronous dynamic RAM (SDRAM) and a non-volatile Memory, such as, a read only memory (ROM), a one time programmable ROM (OTPROM), a programmable ROM (PROM), an erasable and programmable ROM (EPROM), an electrically erasable and programmable ROM (EEPROM), a mask ROM, a flash ROM, a not and (NAND) flash memory, and a not or (NOR) flash memory. According to an embodiment, the internal memory 932 may be a solid state drive (SSD). The external memory 934 may further include a flash drive, such as a compact flash (CF), a secure digital (SD), a micro-SD, a mini-SD, an extreme digital (xD), or a memory stick. The external memory 934 may be functionally connected to the electronic device 901 through various interfaces. According to an embodiment, the electronic device 901 may further include a storage device (or storage medium) such as a hard drive.

The sensor module 940 measures a physical quantity or detects an operation state of the electronic device 901, and converts the measured or detected information to an electronic signal. The sensor module 940 may include, for example, at least one of a gesture sensor 940A, a gyro sensor 940B, a barometer sensor 940C, a magnetic sensor 940D, an acceleration sensor 940E, a grip sensor 940F, a proximity sensor 940G, a RGB (such as, red, green, and blue) sensor 940H, a biometric sensor 940I, a temperature/humidity sensor 940J, an illumination sensor 940K, and a ultraviolet (UV) sensor 940M. Additionally or alternatively, the sensor module 940 may include, for example, an E-nose sensor, an electromyography (EMG) sensor, an electroencephalogram (EEG) sensor, an electrocardiogram (ECG) sensor, an infrared (IR) sensor, an iris sensor, and a fingerprint sensor. The sensor module 940 may further include a control circuit for controlling one or more sensors included in the sensor module 940. In embodiments, the electronic device 901 is capable of including a processor, configured as part of the processor 910 or a separate component, for controlling the sensor module 940. In this case, while the processor 910 is operating in a sleep mode, the processor is capable of controlling the sensor module 940.

The input device 950 includes a touch panel 952, a (digital) pen sensor 954, a key 956, and an ultrasonic input device 958. For example, the touch panel 952 may recognize a touch input in at least one type of a capacitive type, a resistive type, an infrared type, and an acoustic wave type. The touch panel 952 may further include a control circuit. In the capacitive type, the touch panel 952 may recognize proximity as well as a direct touch. The touch panel 952 may further include a tactile layer that provides a tactile reaction to the user. The (digital) pen sensor 954 may be implemented, for example, using a method identical or similar to a method of receiving a touch input of the user, or using a separate recognition sheet. The key 956 may include, for example, a physical button, an optical key, or a key pad. The ultrasonic input device 958 may detect an acoustic wave by a microphone 988 of the electronic device 901 through an input means generating an ultrasonic signal to identify data and may perform wireless recognition.

The display module 960 includes a panel 962, a hologram device 964, and a projector 966. The panel 962 may be, for example, a LCD or an active matrix OLED (AM-OLED). The panel 962 may be implemented to be flexible, transparent, or wearable and may be configured by the touch panel 952 and one module. The hologram device 964 displays a stereoscopic image in the air by using interference of light. The projector 966 projects light on a screen to display an image. For example, the screen may be located inside or outside the electronic device 901. According to an embodiment, the display module 960 may further include a control circuit for controlling the panel 962, the hologram device 964, and the projector 966. The interface 970 includes, for example, a HDMI 972, an USB 974, an optical interface 976, and a D-subminiature (D-sub) 978. Additionally or alternatively, the interface 970 may include, for example, a mobile high-definition link (MHL) interface, an SD card/multi-media card (MMC), or an infrared data association (IrDA) standard interface.

The audio module 980 bi-directionally converts a sound and an electronic signal. The audio module 980 processes sound information input or output through, for example, a speaker 982, a receiver 984, an earphone 986, or the microphone 988. The camera module 991 may photograph a still image and a video, and may include one or more image sensors, such as a front sensor or a back sensor, an image signal processor (ISP) or a flash, such as an LED (light emitting diode) or a xenon lamp. The power managing module 995 manages power of the electronic device 901. The power managing module 995 may include, for example, a power management integrated circuit (PMIC), a charger IC, or a battery gauge. The PMIC may be mounted to, for example, an integrated circuit or a SoC semiconductor. A charging method may be divided into wired and wireless methods. The charger IC charges a battery and prevents over-voltage or over-current from flowing from a charger. According to an embodiment, the charger IC includes a charger IC for at least one of the wired charging method and the wireless charging method. The wireless charging method may include, for example, a magnetic resonance, magnetic induction and electromagnetic wave method, and additional circuits for wireless charging, such as a coil loop, a resonant circuit, and a rectifier may be added. The battery gauge measures, for example, a remaining quantity of the battery 996, or a voltage, a current, or a temperature during charging. The battery 996 may store or generate electricity and supply power to the electronic device 901 by using the stored or generated electricity. The battery 996 may include a rechargeable battery or a solar battery.

The indicator 997 displays particular statuses of the electronic device 901 or a part of the electronic device 901, such as a booting, message, or charging status. The motor 998 converts an electrical signal to a mechanical vibration. The electronic device 901 may include a processing unit, such as a GPU for supporting a mobile TV. The processing unit for supporting the mobile TV may process, for example, media data according to a standard of digital multimedia broadcasting (DMB), digital video broadcasting (DVB), or media flow. Each of the components of the electronic device according to embodiments of the present disclosure may be implemented by one or more components and the name of the corresponding component may vary depending on a type of the electronic device. The electronic device according to embodiments of the present disclosure may include at least one of the above described components, a few of the components may be omitted, or additional components may be further included. Some of the components of the electronic device according to embodiments of the present disclosure may be combined to form a single entity, and thus may equivalently execute functions of the corresponding components before being combined.

Figure 10:
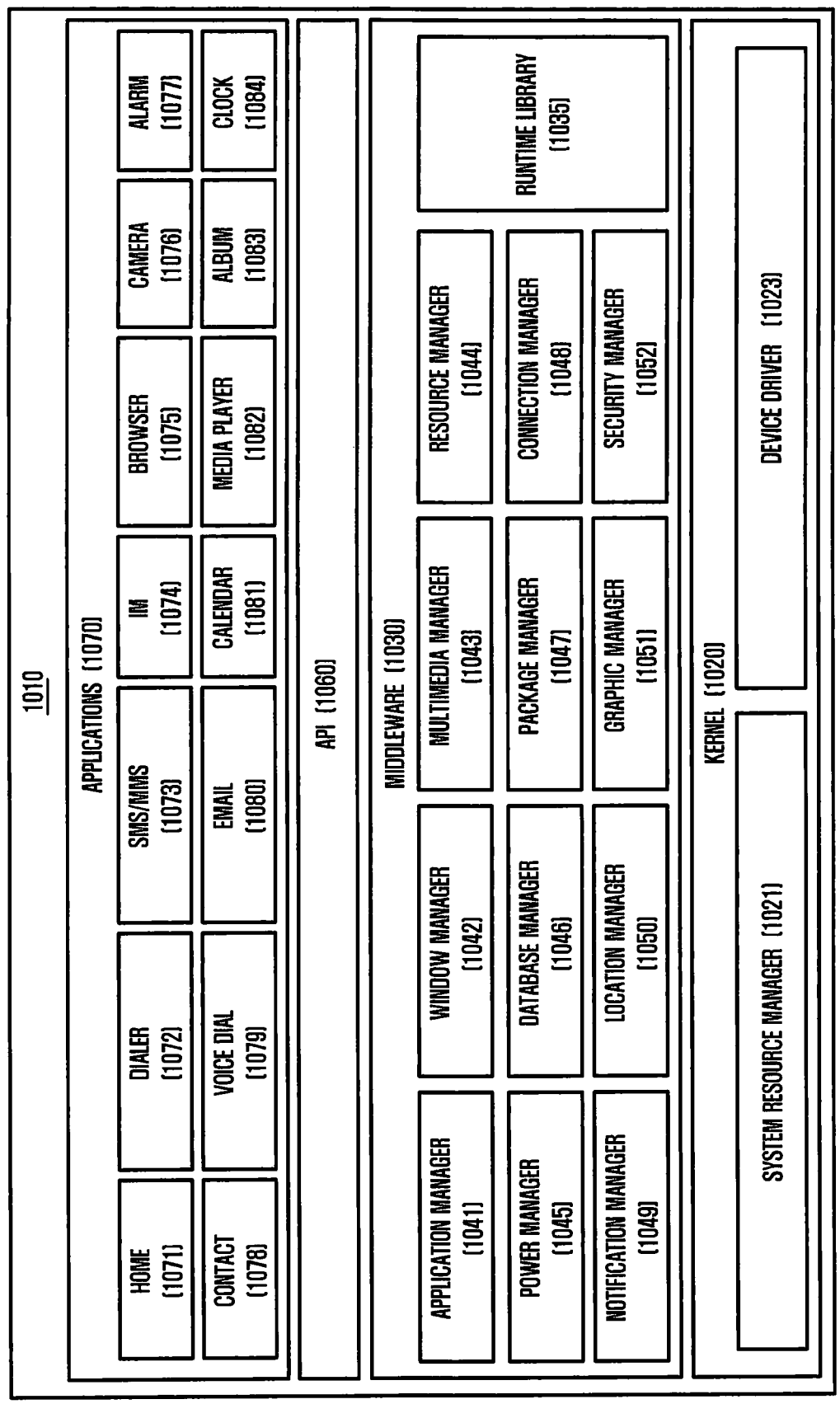
FIG. 10 is a block diagram of a program module according to various embodiments of the disclosure.

FIG. 10 is a block diagram illustrating a programming module according to embodiments of the present disclosure.

Referring to FIG. 10, a programming module 1010 may include an OS that is implemented in hardware to control resources related to an electronic device 100, and/or various applications driven on the OS. For example, the OS may be Android™, iOS™, Windows™, Symbian™, Tizen™, or Bada™. Referring to FIG. 10, the programming module 1010 may include a kernel 1020, middleware 1030, an API 1060, and the applications 1070. At least part of the program module 1010 may be preloaded on the electronic device or downloaded from an external device.

The kernel 1020 may include a system resource manager 1021 and/or a device driver 1023. The system resource manager 1021 may include, for example, a process manager, a memory manager, and a file system manager. The system resource manager 1021 may control, allocate, and/or collect system resources. The device driver 1023 may include, for example, a display driver, a camera driver, a BT driver, a shared memory driver, a USB driver, a keypad driver, a Wi-Fi driver, and an audio driver and an inter-process communication (IPC) driver. The middleware 1030 may include a plurality of modules implemented in advance for providing functions commonly used by the applications 1070. The middleware 1030 may provide the functions through the API 1060 such that the applications 1070 may efficiently use restricted system resources within the electronic apparatus. For example, as shown in FIG. 10, the middleware 1030 may include at least one of a runtime library 1035, an application manager 1041, a window manager 1042, a multimedia manager 1043, a resource manager 1044, a power manager 1045, a database manager 1046, a package manager 1047, a connection manager 1048, a notification manager 1049, a location manager 1050, a graphic manager 1051, and a security manager 1052.

The runtime library 1035 may include a library module that a compiler uses in order to add a new function through a programming language while one of the applications 1070 is being executed. According to an embodiment, the runtime library 1035 may perform an input/output, memory management, and/or a function for an arithmetic function. The application manager 1041 may manage a life cycle of at least one of the applications 1070. The window manager 1042 may manage graphical user interface (GUI) resources used by a screen. The multimedia manager 1043 may detect formats used for reproduction of various media files, and may perform encoding and/or decoding of a media file by using a codec suitable for the corresponding format. The resource manager 1044 may manage resources such as a source code, a memory, and a storage space of at least one of the applications 1070. The power manager 1045 may manage a battery and/or power, while operating together with a basic input/output system (BIOS), and may provide power information used for operation. The database manager 1046 may manage generation, search, and/or change of a database to be used by at least one of the applications 1070. The package manager 1047 may manage installation and/or an update of an application distributed in a form of a package file.

For example, the connectivity manager 1048 may manage wireless connectivity such as Wi-Fi or BT. The notification manager 1049 may display and/or notify of an event, such as an arrival message, a promise, and a proximity notification, in such a manner that does not disturb a user. The location manager 1050 may manage location information of an electronic apparatus. The graphic manager 1051 may manage a graphic effect which will be provided to a user, and/or a user interface related to the graphic effect. The security manager 1052 may provide all security functions used for system security and/or user authentication. According to an embodiment, when an electronic apparatus 100 has a telephone call function, the middleware 1030 may further include a telephony manager for managing a voice and/or video communication function of the electronic apparatus. The middleware 1030 may generate and use a new middleware module through various functional combinations of the aforementioned internal element modules. The middleware 1030 may provide modules specialized according to types of OSs in order to provide differentiated functions. The middleware 1030 may dynamically remove some of the existing elements and/or add new elements, and may exclude some of the elements described in the embodiments of the present disclosure, further include other elements, and/or substitute the elements with elements having a different name and performing a similar function. The API 1060 is a set of API programming functions, and may be provided with a different configuration according to the OS. For example, in Android or iOS, one API set may be provided for each of platforms, and in Tizen, two or more API sets may be provided.

The applications 1070 may include applications for performing various functions, e.g., home 1071, diary 1072, SMS/MMS 1073, instant message (IM) 1074, browser 1075, camera 1076, alarm 1077, contact 1078, voice dial 1079, email 1080, calendar 1081, media player 1082, album 1083, clock 1084, health care, such as an application for measuring amount of exercise or blood sugar level, and environment information, such as, an application for providing atmospheric pressure, humidity, or temperature. According to an embodiment, the applications 1070 are capable of including an application for supporting information exchange between an electronic device and an external device. The information exchange application is capable of including a notification relay application for relaying specific information to external devices or a device management application for managing external devices. For example, the notification relay application is capable of including a function for relaying notification information, created in other applications of the electronic device, such as a short messaging service/multimedia messaging service (SMS/MMS) application, email application, health care application, or environment information application to external devices. In addition, the notification relay application is capable of receiving notification information from external devices to provide the received information to the user. The device management application is capable of managing at least one function of an external device communicating with the electronic device. Examples of the function are turning-on/off the external device or part of the external device, controlling the brightness (or resolution) of the display, applications running on the external device, and services provided by the external device such as a call or messaging service. According to an embodiment, the applications 1070 may include a health care application of a mobile medical device, and specified attributes of an external device. The applications 1070 are capable of including applications received from an external device, and a preloaded application or third party applications that can be downloaded from a server. It should be understood that the components of the program module 1010 may be called different names according to types of operating systems. According to embodiments, at least part of the program module 1010 can be implemented with software, firmware, hardware, or any combination of two or more of them. At least part of the program module 1010 can be implemented by a processor. At least part of the programming module 1010 may include modules, programs, routines, sets of instructions or processes, etc., in order to perform one or more functions.

The term "module" used in the present disclosure may refer to, for example, a unit including at least one combination of hardware, software, and firmware. The "module" may be interchangeably used with a term, such as unit, logic, logical block, component, and/or circuit. The "module" may be a minimum unit of an integrally configured article and/or a part thereof, may be a minimum unit performing at least one function and/or a part thereof, and may be mechanically and/or electronically implemented. For example, the "module" according to the present disclosure may include at least one of an application-specific IC (ASIC) chip, a field-programmable gate arrays (FPGA), and a programmable-logic device for performing operations which have been known and/or are to be developed.

According to embodiments, at least part of the devices or the method according to the present disclosure may be implemented by a command stored in a computer-readable storage medium in a programming module form. When the instructions are executed by at least one processor, the at least one processor may perform functions corresponding to the instructions. The computer-readable storage medium may be, for example, the memory 120. At least a part of the programming module may be implemented by the processor 150. At least some of the programming modules may include, for example, a module, a program, a routine, a set of instructions or a process for performing one or more functions.

The computer-readable recording medium may include magnetic media such as a hard disk, a floppy disk, and a magnetic tape, optical media such as a compact disc ROM (CD-ROM) and a DVD, magneto-optical media such as a floptical disk, and hardware devices specially configured to store and perform a program instruction, such as a ROM, a RAM, or a flash memory. In addition, the program instructions may include high class language codes, which may be executed in a computer by using an interpreter, as well as machine codes made by a compiler. The aforementioned hardware device may be configured to operate as one or more software modules in order to perform the operation of the present disclosure, and vice versa.

The module or programming module of the present disclosure may include at least one of the aforementioned components with omission of some components or addition of other components. The operations of the modules, programming modules, or other components may be executed in series, in parallel, recursively, or heuristically. Some operations may be executed in a different order, omitted, or extended with other operations.

An electronic device including camera module and method for controlling electronic device in accordance with various embodiments of the present invention have been described above through the specification and drawings. Although specific terms are used, the terms are merely used according to their common meanings in order to easily describe the technical contents of this invention and help in understanding of this invention, and this invention is not limited to the aforementioned embodiments of this invention. That is, it will be evident to those skilled in the art that various embodiments based on the technical spirit of this invention can be implemented.

The invention claimed is:

1. A camera module, comprising:
an image sensor configured to comprise a first pixel comprising a plurality of first light receiving units and a second pixel comprising a plurality of second light receiving units; and
a computation circuit functionally connected to the image sensor and configured to measure depth information,
wherein the computation circuit is configured to:
detect proximity of an external object through the image sensor in a sensor mode,
obtain a first signal corresponding to a first part of the external object using the plurality of first light receiving units and a second signal corresponding to a second part of the external object using the plurality of second light receiving units,
identify first phase difference information corresponding to the first signal and second phase difference information corresponding to the second signal,
identify location information for the first part and the second part based on at least the first phase difference information and the second phase difference information, and
provide the location information to an external processor of the camera module connected to the computation circuit, and
wherein the computation circuit is configured to:
identify whether a motion of the external object has occurred based on at least the first phase difference information and the second phase difference information,
recognize a gesture according to the motion of the external object based on the motion of the external object being occurred, and
provide information of the recognized gesture to the external processor to perform a function of the electronic device corresponding to the gesture.

2. The camera module of claim 1, wherein:
the image sensor is configured to comprise a vision auto exposure (AE) circuit for controlling exposure of the external object recognized by the image sensor, and
the vision AE circuit is configured to adjust at least one of an exposure time or exposure sensitivity of the image sensor for recognizing the external object based on collected context and to operate solely.

3. The camera module of claim 2, wherein the image sensor is configured to:
operate in a bining mode in which only some pixels are driven, and
recognize the external object using only the driven some pixels.

4. The camera module of claim 1, wherein the computation circuit is configured to:
obtain phase difference information of high resolution by adding up the first phase difference information and the second phase difference information, and
obtain phase difference information of high sensitivity based on the obtained phase difference information of high resolution.

5. The camera module of claim 1, wherein the computation circuit is configured to:
generate image data for the external object by combining the plurality of first light receiving units and the plurality of second light receiving units when an input to request capture for the external object in a photographing mode is detected, and
not output the generated image data in response to the input to request capture for the external object.

6. The camera module of claim 1, wherein the computation circuit is configured to:
obtain distance information between the image sensor and the external object based on at least the first phase difference information and the second phase difference information,
identify whether the motion of the external object has occurred based on the obtained distance information,
obtain motion information comprising at least one of a motion direction or speed of the external object based on the motion of the external object being occurred, and
provide the obtained motion information to the external processor.

7. An electronic device, comprising:
a camera module configured to recognize an external object in a sensor mode;
a memory; and
a processor electrically connected to the camera module and the memory,
wherein the camera module comprises:
an image sensor configured to comprise a first pixel comprising a plurality of first light receiving units and a second pixel comprising a plurality of second light receiving units; and
a computation circuit configured to measure depth information,
wherein the computation circuit is configured to:
obtain a first signal corresponding to a first part of the external object using the plurality of first light receiving units and a second signal corresponding to a second part of the external object using the plurality of second light receiving units,
identify first phase difference information corresponding to the first signal and second phase difference information corresponding to the second signal,
identify location information for the first part and the second part based on at least the first phase difference information and the second phase difference information, and
recognize the external object using at least the location information, and
wherein the processor is configured to:
obtain, from the camera module, information of a gesture according to a motion of the external object recognized by the computation circuit of the camera module in the sensor mode, and
perform a function of the electronic device corresponding to the gesture.

8. The electronic device of claim 7,
wherein the computation circuit is configured to recognize the external object using image information corresponding to the external object and obtained from at least some of the first pixel and the second pixel.

9. A method of controlling an electronic device comprising a camera module, the method comprising:
detecting proximity of an external object through an image sensor in a sensor mode,
recognizing the external object using a first pixel comprising a plurality of first light receiving units and a second pixel comprising a plurality of second light receiving units configuring the image sensor;

obtaining a first signal corresponding to a first part of the recognized external object using the plurality of first light receiving units and a second signal corresponding to a second part of the recognized external object using the plurality of second light receiving units;

identifying first phase difference information corresponding to the first signal and second phase difference information corresponding to the second signal;

identifying location information for the first part and the second part based on at least the first phase difference information and the second phase difference information; and providing the location information to an external processor of the camera module, further comprising:

identifying whether a motion of the external object has occurred based on at least the first phase difference information and the second phase difference information;

recognizing a gesture according to the motion of the external object based on the motion of the external object being occurred; and providing information of the recognized gesture to the external processor to perform a function of the electronic device corresponding to the gesture.

10. The method of claim 9, wherein recognizing the external object comprises:

collecting context for the electronic device; and adjusting at least one of an exposure time or exposure sensitivity of the image sensor for recognizing the external object based on the collected context.

11. The method of claim 10, wherein:

the image sensor is configured to operate in a bining mode in which only some adjusted pixels are driven, and recognizing the external object comprises recognizing the external object using only the driven some pixels.

12. The method of claim 9, wherein identifying first phase difference information corresponding to the first signal and second phase difference information corresponding to the second signal comprises:

obtaining phase difference information of high resolution by adding up the first phase difference information and the second phase difference information; and obtaining phase difference information of high sensitivity based on the obtained phase difference information of high resolution.

13. The method of claim 9, wherein identifying first phase difference information corresponding to the first signal and second phase difference information corresponding to the second signal further comprises:

generating image data for the external object by combining the plurality of first light receiving units and the plurality of second light receiving units when an input to request capture for the external object in a photographing mode is detected.

14. The method of claim 9, further comprising:

obtaining distance information between the image sensor and the external object based on the identified location information for the first part and the second part;

identifying whether the motion of the external object has occurred based on the obtained distance information;

obtaining motion information comprising at least one of a motion direction or speed of the external object based on the motion of the external object being occurred; and providing the obtained motion information to the external processor.

* * * * *